US012591207B2

(12) United States Patent
Bonke

(10) Patent No.: US 12,591,207 B2
(45) Date of Patent: Mar. 31, 2026

(54) WATCH GLASS COMPRISING A DECORATIVE ELEMENT

(71) Applicant: Realization Desal AG, Oberwil bei Zug (CH)

(72) Inventor: Michael Bonke, Oberwil bei Zug (CH)

(73) Assignee: REALIZATION DESAL AG, Oberwil bei Zug (CH)

( * ) Notice: Subject to any disclaimer, the term of this patent is extended or adjusted under 35 U.S.C. 154(b) by 656 days.

(21) Appl. No.: 17/923,741

(22) PCT Filed: Apr. 29, 2021

(86) PCT No.: PCT/EP2021/061341
§ 371 (c)(1),
(2) Date: Nov. 7, 2022

(87) PCT Pub. No.: WO2021/224117
PCT Pub. Date: Nov. 11, 2021

(65) Prior Publication Data
US 2023/0176529 A1     Jun. 8, 2023

(30) Foreign Application Priority Data

May 8, 2020     (DE) ......................... 102020112541.0

(51) Int. Cl.
G04B 47/04          (2006.01)
C03C 27/04          (2006.01)
G04B 39/00          (2006.01)
(52) U.S. Cl.
CPC ............ *G04B 47/042* (2013.01); *C03C 27/04* (2013.01); *G04B 39/002* (2013.01)

(58) Field of Classification Search
CPC .............................. G04B 47/02; G04B 47/042
See application file for complete search history.

(56) References Cited

U.S. PATENT DOCUMENTS 4,473,306 A      9/1984  Lederrey
5,119,350 A  *   6/1992  Delacretaz ......... A44C 17/0258
                                                      368/322
(Continued)

FOREIGN PATENT DOCUMENTS

DE      102015207049 A1     10/2016
EP           0098240 A1      1/1984
(Continued)

OTHER PUBLICATIONS

International Search Report from International Application No. PCT/EP2021/061341, mailed on Jul. 2, 2021, 4 pages.
(Continued)

*Primary Examiner* — Edwin A. Leon
*Assistant Examiner* — Jason M Collins
(74) *Attorney, Agent, or Firm* — Tucker Ellis LLP

(57)     ABSTRACT
A watch glass includes a first glass, a second glass and a decorative element. The second glass is connected to the first glass via a connecting intermediate layer. The decorative element is inserted in a setting, which is arranged in a watch glass recess. The watch glass recess is formed by a first recess in the first glass and a second recess in the second glass. Here, a space of the watch glass recess is defined by the first glass, the second glass and the setting. The space is filled with connecting material of the connecting intermediate layer, so that the setting is connected via the connecting material to the first class and the second glass.

15 Claims, 5 Drawing Sheets

(56)     References Cited

U.S. PATENT DOCUMENTS

Figure 1:
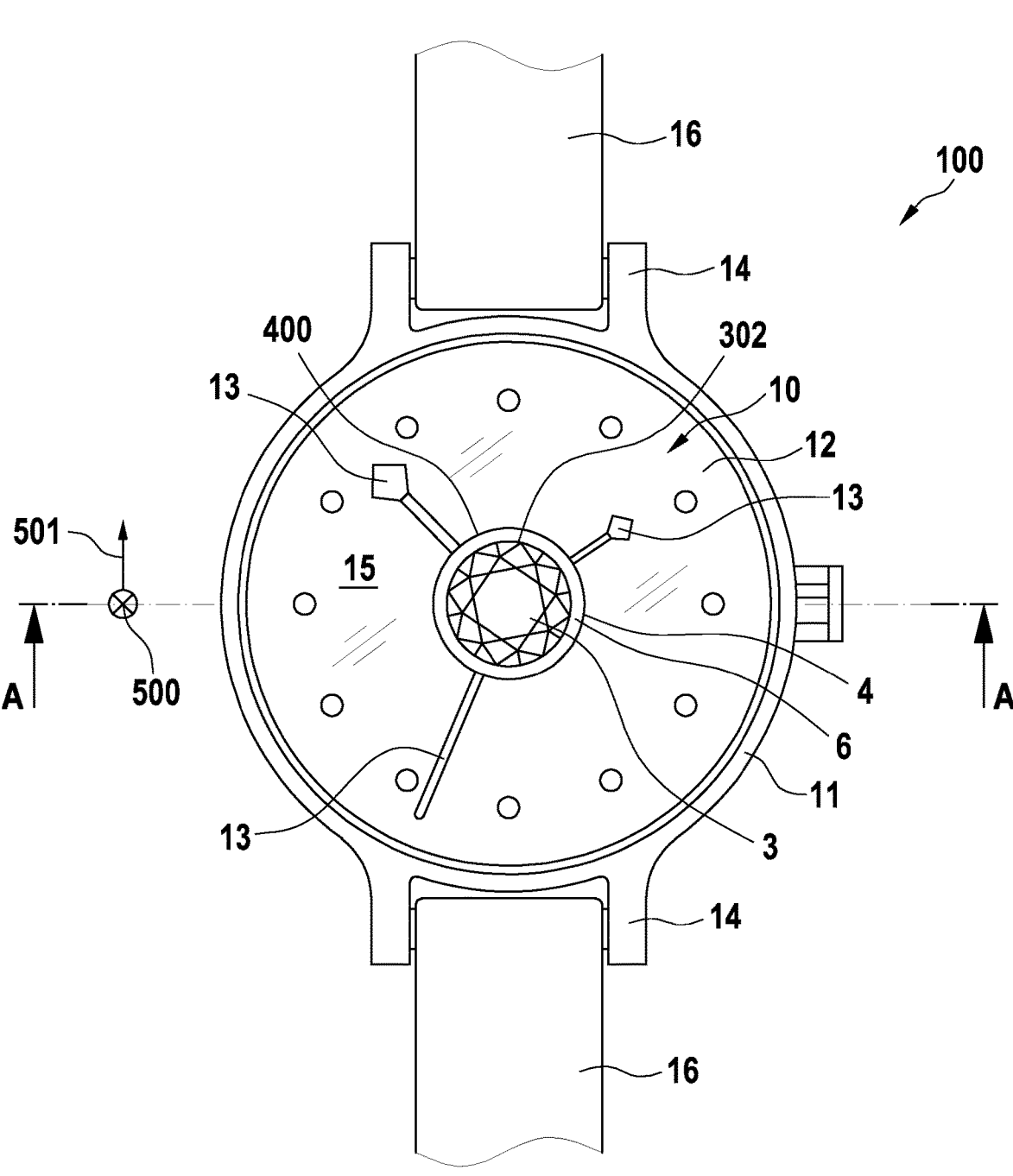

| 9,820,538 | B2 * | 11/2017 | Lebreton | ................. | A44C 17/04 |
| 10,743,625 | B2 * | 8/2020 | Bourban | ................. | C25D 5/022 |
| 11,378,919 | B2 * | 7/2022 | Bonke | .................. | G04B 47/042 |

FOREIGN PATENT DOCUMENTS

| EP | 2901883 | A1 | 8/2015 |
| FR | 2646759 | A1 | 11/1990 |

OTHER PUBLICATIONS

Office Action from corresponding German Application No. 10 2020 112 541.0 mailed on Feb. 3, 2021, 4 pages.

* cited by examiner

Fig. 2

Fig. 7

WATCH GLASS COMPRISING A DECORATIVE ELEMENT

RELATED APPLICATION DATA

This application is a National Phase Application of International Application No. PCT/EP2021/061341 filed Apr. 29, 2021, which claims benefit of German Application No. DE 10 2020 112 541.0 filed May 8, 2020, the entireties of which are incorporated by reference herein.

The invention relates to a watch glass with a decorative element as well as a watch with such a watch glass.

Watch glasses with decorative elements are known, for example, from DE 10 2015 207 049 A1.

It is an object of the present invention to create a watch glass with a decorative element, wherein the decorative element is attached to the watch glass in a secure manner.

The solution of this object is achieved by a watch glass with the features of the independent claim. The dependent claims contain advantageous developments and embodiments of the invention.

The watch glass comprises a first glass, a second glass, which is connected to the first glass via a connecting intermediate layer, a watch glass recess, which is formed by a first recess in the first glass and a second recess in the second glass, and a decorative element. The decorative element is inserted in a setting, which is arranged in the watch glass recess. Here, a space of the watch glass recess, which is defined by the first glass, the second glass and the setting, is filled with connecting material of the connecting intermediate layer, so that the setting is connected to the first glass and the second glass via the connecting material.

By providing the first and the second glass, which are connected to one another via the connecting intermediate layer, a stable watch glass is created. In particular, it is achieved by this structure that potential microcracks, which can be produced by forming the first recess in the first glass and the second recess in the second glass, end at the connecting intermediate layer. Thus, the microcracks of the one glass cannot be transferred to the other glass. Furthermore, due to the contacting of the glasses with the connecting intermediate layer, which has a greater elasticity in comparison with the glasses, in the case of a potential impact of the decorative element and/or of the setting, the impact energy can be distributed to both glasses via the connecting intermediate layer and absorbed by those. This is particularly advantageous if the watch glass has a large decorative element and thus also a correspondingly large watch glass recess.

To the fracture strength of the watch glass contributes in particular the connecting material of the connecting intermediate layer in the space of the watch glass recess between the first glass, the second glass and the setting. The reason for this is that due to the connecting material in this space a direct contact between the setting, which can in particular be made of metal, and the watch glass is avoided. Thus, the risk of splintering of the glasses at the position of the watch glass recess is significantly reduced or eliminated.

The connecting intermediate layer and in particular the connecting material thereof in the space of the watch glass recess between the first glass, the second glass and the setting further enables a fixed connection of the setting and thus also a fixed arrangement of the decorative element at the watch glass.

Furthermore, the present invention offers the advantage of a watertight watch glass, since due to adhesion and/or cross-linking effects the setting abuts on the glasses and the glasses abut on one another in a watertight manner.

In addition, potential surface deviations of the glasses can be compensated by the connecting intermediate layer, what results to a very stable connection of the glasses.

It results from the above discussion that, within the scope of the invention, the connecting intermediate layer advantageously comprises connecting material that is located between opposite surfaces of the glasses as well as connecting material that is located in the space of the watch glass recess between the first glass, the second glass and the setting. In other words, the connecting material between the opposite surfaces of the glasses and the connecting material in the already described space are to be advantageously understood as a uniform/continuous connecting intermediate layer, which serves to connect the first glass to the second glass as well as the setting to the glasses.

Furthermore, the formulation that the space of the watch glass recess between the first glass and the second glass is filled with connecting material of the connecting intermediate layer advantageously means that the space is completely filled.

The formulation that the setting is arranged in the watch glass recess means in particular that the setting is positioned in the first recess as well as in the second recess.

The setting is in particular a metal setting, such as, for example, a gold setting, platinum setting, silver setting or stainless steel setting.

In the setting, the decorative element is advantageously in direct contact only with air and/or the setting. This means that the decorative element neither directly contacts the glasses nor the connecting intermediate layer. A direct contact between two contacting components exists if no further component or connecting material is provided between the contacting components in the connecting direction.

Preferably, the setting partially surrounds the decorative element so that a part, in particular an upper part, of the decorative element is not covered by any further component.

In particular, the decorative element is partially in direct contact with the setting. Preferably, the decorative element below a contact region of the decorative element with the setting is in direct contact with air.

The first glass is advantageously arranged on the second glass.

Within the scope of the present invention, the glass, which the light encounters first when the watch glass is arranged in a watch, is referred to as the first glass. Correspondingly, the glass, which faces towards an interior space of a housing of the watch or the dial, is referred to as the second glass.

The first glass and the second glass are preferably each formed as a glass plate. Here, the first glass and the second glass are preferably connected to one another in a planar manner via the connecting intermediate layer.

In particular, the first glass is formed from sapphire glass.

The connecting intermediate layer is arranged in particular between the first glass and the second glass, in particular between opposite surfaces of the glasses.

Within the scope of the invention, the surface of the first glass facing towards the second glass can in particular also be referred to as lower surface of the first glass. Accordingly, within the scope of the invention, the surface of the second glass facing the first glass can in particular also be referred to as upper surface of the second glass.

Via the connecting intermediate layer, the first glass and the second glass are materially connected to one another.

Preferably, a maximum thickness of the connecting intermediate layer between the first glass and the second glass in the thickness direction of the glasses is less than a maximum thickness of the connecting material of the connecting intermediate layer in the space between the first glass, the second glass and the setting in the thickness direction of the glasses.

Preferably, a maximum thickness of the connecting intermediate layer between the first glass and the second glass in the thickness direction of the glasses is less than a maximum thickness of the connecting material of the connecting intermediate layer in the space between the first glass, the second glass and the setting in a direction perpendicular to the thickness direction of the glasses.

Preferably, the connecting material in the space between the first glass, the second glass and the setting has a maximum thickness in the thickness direction of the glasses and/or in a direction perpendicular to the thickness direction of the glasses of at least 2 mm, preferably at least 3 mm, further preferably at least 4 mm, particularly preferably at least 5 mm.

Preferably, the connecting intermediate layer can be formed from an organic or inorganic connecting or adhesive material or adhesive layer or an elastic film (also: laminating film or composite film, in particular adhesive film).

For example, the connecting intermediate layer can be formed from an EVA laminating film (ethylene-vinyl acetate copolymer laminating film) or a PVB laminating film (polyvinyl butyral laminating film) or a PU laminating film (polyurethane laminating film).

In particular, the connecting intermediate layer can be formed from cast resin. The cast resin can be, for example, a two-component epoxy resin or a UV-curing one-component adhesive or a cross-linking highly transparent silicone.

The connecting intermediate layer is advantageously transparent. Since the connecting intermediate layer is not or hardly visible, a particularly elegant appearance is given to the watch glass and thus also to the watch.

The decorative element is preferably a gemstone, in particular a precious stone or semi-precious stone, particularly preferably a diamond. In particular, the gemstone can be natural or synthetic.

Within the scope of the invention, a cut stone, in particular with optical properties, such as transparency is to be understood as a gemstone. The gemstone can in particular be faceted.

Furthermore, within the scope of the invention, a precious stone is understood in particular as a gemstone that meets the following four criteria:

1. rarity
2. Mohs hardness (precious stone hardness) greater than or equal to 5, preferably greater than or equal to 6, particularly preferably greater than or equal to 7
3. transparency
4. refractive index greater than or equal to 1.56, preferably greater than or equal to 1.7 In particular, diamonds, rubies, sapphires, and emeralds are precious stones.

A diamond has in an advantageous manner a Mohs hardness of 10 and a refractive index of 2.42.

In the present invention, a glass part is, because of its chemical composition and structure, in particular not understood as a gemstone (semi-precious stone, precious stone or other gemstone), even though the glass part consists of a material (starting material) which is classified as a gemstone (semi-precious stone, precious stone or other gemstone) in its raw state. The glass part can, for example, be a quartz glass, wherein the quartz glass does not count among the gemstones, even though quartz (starting material) is a gemstone.

According to an alternative advantageous embodiment of the watch glass, the decorative element can be a metal insert, for example a gold insert.

If the watch glass has a plurality of decorative elements, any arbitrary combination of semi-precious stones, precious stones, other gemstones and metal inlays is possible.

In particular, a region of the setting can directly contact the first glass and/or the second glass.

Preferably, the setting is formed to be rotationally symmetrical.

Preferably, the setting has at least one recess, which is formed in a jacket surface of the setting.

The recess is advantageously filled with connecting material of the connecting intermediate layer. Thus, a large amount of the connecting material is available for attaching the setting to the watch glass. In particular, due to the at least one recess, a contact area between the setting and the connecting intermediate layer is enlarged, by what large settings or decorative elements can also be attached to the watch glass in a secure manner.

In particular, a plurality of previously described recesses are formed in the jacket surface of the setting.

The at least one recess can according to a preferred design of the invention be formed as a depression, in particular groove. The depression can preferably be formed circumferentially, in particular completely circumferentially, i.e. over 360 degrees.

According to an alternative advantageous design of the invention, the at least one recess can be formed as a hole.

The hole can be particularly preferably continuous. Thus, the connecting material in the continuous hole can be connected to the connecting material in the space of the watch glass recess between the first glass, the second glass and the jacket surface of the setting. Thus, the setting is held not only by connecting material on its jacket surface, but also by connecting material which passes through the setting. The latter reinforces the connection of the setting to the watch glass, by what the setting cannot disengage from the watch glass recess even in the case of a strong impact of the setting, for example in the case of the watch falling down.

In particular if a plurality of continuous holes are provided in the setting, the holes can preferably overlap each other in a grid-like manner. Thus, also a grid of connecting material can be formed.

Preferably, the setting has a first setting region and a second setting region. Here, the space of the watch glass recess between the first glass, the second glass, the first setting region and the second setting region is filled in an advantageous manner with connecting material.

Furthermore, the first setting region can preferably be inclined relative to an axis perpendicular to the glasses. Accordingly, the second setting region can preferably be inclined relative to an axis perpendicular to the glasses.

"Inclined" means in an advantageous manner that the respective setting region does not extend parallel to an axis perpendicular to the glasses.

The axis perpendicular to the glasses is in particular parallel to the thickness direction of the glasses.

Particularly preferably, the first setting region and/or the second setting region is/are conically shaped.

The first setting region and the second setting region advantageously define an intermediate space, which, in the mounted state, coincides partially or completely with a region of the space of the watch glass recess between the first glass, the second glass and the setting. This means that this intermediate space is filled with connecting material of the connecting intermediate layer in the arranged state of the setting in the watch glass recess.

Preferably, the second setting region has a greater inclination than the first setting region. In other words, the second setting region is preferably more strongly inclined relative to the axis perpendicular to the glasses than the first setting region.

Preferably, an angle between the first setting region and the second setting region is less than 90 degrees, preferably between 10 degrees and 50 degrees, particularly preferably between 20 degrees and 40 degrees.

Advantageously, the connecting material of the connecting intermediate layer in the space between the first glass, the second glass and the setting has a triangle-shaped cross-section in a section perpendicular to the glasses. The section plane is defined in particular by the thickness direction of the glasses and the direction perpendicular to the thickness direction.

In particular, the first setting region faces away from the interior space of the housing of the watch when the setting is arranged in the watch glass recess. Here, the second setting region faces in particular towards the interior space of the housing.

Furthermore, the first setting region has an opening, through which the decorative element is insertable into the setting.

In particular, both the first recess and the second recess are formed continuously.

Preferably, the second setting region projects beyond a lower surface of the second glass, in particular at most by 20%, preferably at most by 10%, particularly preferably at most by 5%, of a thickness of the watch glass.

Within the scope of the present invention, the thickness of the watch glass corresponds in particular to the sum of the thicknesses of the first glass, the second glass and the connecting intermediate layer in the region between the first glass and the second glass.

According to an alternative advantageous embodiment of the invention, the second setting region ends in the watch glass recess. This means that the second setting region does not protrude beyond the lower surface of the second glass.

In particular, an end region of the second setting region can be flush with the lower surface of the second glass. Here, in particular the part of the second setting region, which has the greatest distance from the upper surface of the first glass in the thickness direction of the glasses is understood as "end region".

Since the decorative element does not project at all or only slightly beyond the second glass, the housing of the watch can also be made compact or more space can be available for the clockwork, the hands and the dial in the housing. The movement of the hands is thus not impaired, wherein also a design freedom of the dial is provided for.

Preferably, the decorative element has a dimension parallel to the thickness direction of the glasses, which is at least 50%, preferably at least 80%, particularly preferably over 100%, of a thickness of the watch glass. The same preferably also applies to the setting.

The decorative element can preferably have a cross-sectional area perpendicular to the thickness direction which is at least $\frac{1}{20}$, preferably at least $\frac{1}{16}$, particularly preferably at least $\frac{1}{10}$, of an area of the upper surface of the first glass.

If the decorative element is a gemstone, the gemstone preferably has a weight of at least 2 carat, preferably of at least 3 carat, preferably of at least 4 carat, particularly preferably of at least 5 carat. It should be noted that the weight of a gemstone is in particular an indicator of its size. That is, a gemstone of one type (e.g. brilliant) greater than a gemstone of the same type (within the framework of the example also brilliant), which, however, has a smaller weight. This means that also a cross-sectional area of a gemstone (of the same type) perpendicular to the thickness direction increases with increasing weight. A carat corresponds to 0.2 grams ($2\times10^{-4}$ kg).

A decorative element with the aforementioned cross-sectional area or a gemstone with the aforementioned weight is to be in particular understood as a large decorative element within the scope of the invention. The appearance of the watch glass is characterized by the use of a large decorative element.

According to an alternative design of the invention, the decorative element can be a gemstone with a weight of less than 2 carat. For example, the gemstone can have a weight of 0.1 carat, 0.15 carat, 0.5 carat or 1 carat.

It is of course also possible that a plurality of decorative elements, in particular a plurality of gemstones, is provided in the watch glass. In such a watch glass, any arbitrary combination is possible in view of the weight of the decorative elements, in particular the gemstones. Thus, for example, a central, in particular round, gemstone with a weight of 1 carat and two marquise-shaped gemstones with a weight of 0.15 Carat and 0.10 Carat, respectively, can be used.

Preferably, the decorative element projects beyond an upper surface of the watch glass. Here, a part of the decorative element is arranged in an advantageous manner in the watch glass recess.

In other words, a first part of the decorative element is preferably arranged in the watch glass recess, wherein a second part of the decorative element projects beyond the first glass.

The watch glass recess is formed in particular in the thickness direction.

The watch glass recess can preferably be arranged centrally in the watch glass. That is, preferably, the first recess is arranged centrally in the first glass and the second recess centrally in the second glass. "Centrally" means that a center axis/axis of gravity of the watch glass recess or of the respective recess lies on a center axis/axis of gravity of the watch glass or of the respective glass, respectively.

According to a preferred embodiment of the invention, the watch glass recess has the same cross section over its entire depth. This means that the first recess and the second recess have the same cross section over their respective depth. Under the term "cross-section" one understands both a cross-sectional area and a cross-sectional shape. The watch glass recess can thus be manufactured in a simple manner. The depth of the watch glass recess and respectively of the first recess and the second recess is the dimension of the corresponding recess in the thickness direction of the glasses.

For example, the watch glass recess can be cylinder-shaped.

Other shapes for the first recess and/or the second recess are, however, also possible. For example, the first recess and/or the second recess can have a rectangular or elliptical cross-section.

Preferably, the shape of the respective recess corresponds to the shape of the setting, in particular the shape of the first setting region and/or of the second setting region, in particular if the first setting region and/or the second setting region is/are in contact with the first glass and/or the second glass.

According to an alternative advantageous embodiment of the invention, the first recess is preferably at least partially, completely, i.e. over 360 degrees, circumferentially chamfered at the upper surface and/or lower surface of the first glass.

Alternatively or additionally, the second recess can preferably be at least partially, in particular completely, i.e. over 360 degrees, circumferentially chamfered at the upper surface and/or lower surface of the second glass.

In particular, the first recess and/or the second recess can have a conical region. Here, the first recess and/or the second recess can preferably have a cylinder-shaped region.

Particularly preferably, both recesses each have a conical region. Here, both recesses preferably each also have a cylinder-shaped region. Advantageously, the conical regions are arranged at the upper surface of the respective glass. Correspondingly, the cylinder-shaped regions are preferably arranged at the lower surface of the respective glass. Thus, here, the cylinder-shaped region of the first recess advantageously faces towards the conical region of the second recess.

Within the scope of the invention, the upper surface of the first glass is to be understood as the upper surface of the watch glass. Accordingly, the lower surface of the second glass is to be understood as the lower surface of the watch glass.

The first recess and/or the second recess preferably has/ each have a cross-sectional area perpendicular to the thickness direction, which is at least $\frac{1}{20}$, preferably at least $\frac{1}{16}$, particularly preferably at least $\frac{1}{10}$, of an area of the upper surface of the first glass.

Preferably, the first setting region abuts on the conical region of the first recess, optionally with an intermediate bonded joint, and has a complementary, in particular the same, shape with it at the contact point.

Preferably, the first setting region is connected to the conical region of the first recess. In particular, a material connection, particularly preferably a bonded joint, is provided between the first setting region and the conical region of the first recess.

In a corresponding manner, the second setting region can preferably abut on the cylinder-shaped region of the second recess, optionally with an intermediate bonded joint, and have a complementary, in particular the same, shape with it at the contact point.

Preferably, the second setting region is connected to the cylinder-shaped region of the second recess. In particular, a material connection, particularly preferably a bonded joint, is provided between the second setting region and the cylinder-shaped region of the first recess.

The present invention further relates to a watch, which comprises a previously described watch glass. The watch has, in particular, a housing at which the watch glass is arranged. The watch glass is preferably mounted in the housing and glued thereto. The watch glass is arranged at the housing such that the first glass faces away from an interior space of the housing. In other words, the first glass is the outer glass in the watch. The second glass is correspondingly the inner glass of the watch.

The watch is preferably a wristwatch.

For manufacturing the previously described watch glass, a method is proposed that comprises the following steps:

providing the first glass and the second glass, forming the first recess in the first glass and the second recess in the second glass for forming the watch glass recess, arranging a setting, preferably with an already inserted decorative element, in the recess, and connecting the first glass to the second glass via the connecting intermediate layer; especially after the arrangement of the decorative element in the recess.

For providing a decorative element formed as a gemstone, a raw stone can be cut so that the gemstone has the desired shape and cut.

The first recess and/or the second recess can preferably be formed into the respective glass by means of laser drilling or mechanical drilling. Alternatively, the first recess and/or the second recess can preferably be pressed into the corresponding glass by use of heat, wherein the corresponding glass can be cut in particular after the pressing operation.

After the formation of the recesses, the upper surface and/or lower surface of the first glass and/or of the second glass is/are preferably ground. Thus, potentially emerging breakouts at the recesses can be removed.

Connecting the first glass to the second glass via the connecting intermediate layer preferably comprises heating the arrangement of the first glass, the second glass and a starting intermediate layer arranged between them at a temperature between 110 degrees Celsius and 150 degrees Celsius, in particular between 130 degrees Celsius to 145 degrees Celsius.

The starting intermediate layer can preferably be an organic or inorganic connecting or adhesive material or adhesive layer or an elastic film (also: laminating film or composite film, in particular adhesive film). If a film for connecting the glasses is used, it has a recess at the position of the watch glass recess when the film is arranged between the glasses. The cross-section of the recess of the film is selected depending on the cross-section of the watch glass recess at the contact surface between the first glass and the second glass. In particular, the recess of the film has the same cross-sectional shape at the previously described position.

Furthermore, a cross-sectional area of the recess of the film is preferably greater than or equal to the cross-sectional area of the watch glass recess at the previously described position.

In particular, the starting intermediate layer can be formed from cast resin. The cast resin can be, for example, a two-component epoxy resin or a UV-curing one-component adhesive or a cross-linking silicone (one-component or two-component product).

Furthermore, connecting the first glass to the second glass can preferably take place under vacuum in order to remove air from the intermediate space between the glasses, and by exerting pressure, in particular of 1 bar (inclusive) to 8 bar (inclusive), on the arrangement of the glasses in order to achieve a strong connection of the glasses to one another. In particular at a pressure of 8 bar, a particularly high clarity or transparency of the connecting intermediate layer can be achieved.

The step of connecting the first glass to the second glass via the connecting intermediate layer advantageously also comprises the step of connecting the setting to the watch glass. In particular under the already described temperature and pressure conditions, material of the starting intermediate layer flows out of the region between the first glass and the second glass and enters the (free) space of the watch glass recess that is defined by the first glass, the second glass and the setting. In other words, material of the starting intermediate layer flows from the region between the first glass and the second glass into the space around the setting. In particular, this space is completely filled with material of the starting intermediate layer.

Due to the described connecting process, an airtight joint between the first glass and the second glass as well as between the two glasses and the setting is achieved. Due to the lack of cavities or air bubbles between the setting and the connecting intermediate layer, a vacuum effect occurs, in case of which the setting is pressed by the air pressure exerted thereon into the watch glass recess. In the case of a mechanical loading of the setting, where the setting could begin to wobble in the watch glass recess, the vacuum sucks the setting in. The setting is therefore not only held by the effect of the connecting intermediate layer, but also by the described occurring vacuum effect.

The starting intermediate layer can be a liquid adhesive material, which then is cured for connecting the glasses to one another as well as to the setting.

The connecting process for connecting the first glass to the second glass preferably takes place in an autoclave or a laminator. In the laminator, the arrangement of the first glass, the second glass, the starting intermediate layer arranged between them and the cased decorative element is evacuated, in particular in a vacuum bag, wherein at the same time a pressure of 1 bar, is exerted from the outside, in particular by the air surrounding the vacuum bag, on the vacuum bag and thus also on the previously described arrangement. In the autoclave, in addition to the prevailing vacuum, under which the arrangement is arranged, in particular a pressure of greater than 1 bar up to 8 bar (inclusive) is exerted on the arrangement by means of a compressor.

Within the scope of the present invention, the connecting process for connecting the first glass to the second glass can also be referred to as a laminating process.

In particular, the setting and the watch glass recess are formed such that in the arranged state of the setting in the watch glass recess the setting partially contacts the first glass and/or the second.

The first recess preferably has a first recess region and a second recess region. The first and the second recess region of the first recess advantageously have different shapes.

Correspondingly, the second recess can preferably have a first recess region and a second recess region. The first and the second recess region of the second recess advantageously have different shapes.

Preferably, the first recess region of the first recess can be conical. Preferably, the second recess region of the first recess can be cylinder-shaped.

Correspondingly, the first recess region of the second recess can preferably be conical. Preferably, the second recess region of the second recess can be cylinder-shaped.

In particular, the first setting region contacts the first, in particular conical, recess region of the first recess, and the second setting region the second, in particular cylinder-shaped, recess region of the second recess.

Preferably, the setting can be materially connected, in particular glued, to the first glass and/or the second glass via their contact surfaces.

In particular, such a connection is provided between the first setting region and the first, in particular conical, recess region of the first recess and/or between the second setting region and the second, in particular cylinder-shaped, recess region of the second recess.

Particularly preferably, the setting is materially connected, in particular glued, only to the first glass at its contact point with the first glass. In particular, such a connection is provided only between the first setting region and the first, in particular conical, recess region of the first recess.

The described material connection, in particular bonded joint, between the setting and the first glass at their contact surfaces has the advantage that in the finished watch glass a contact of the connecting intermediate layer with the ambient air is avoided, whereby air humidity cannot reach the connecting intermediate layer. Thus, the adhesion property of the connecting intermediate layer in the finished watch glass is ensured even if the connecting intermediate layer is formed from a hygroscopic material. Furthermore, it can be avoided that material of the starting intermediate layer escapes from the watch glass recess while connecting the first glass to the second glass. In addition, the described material connection has the advantage that the setting remains motionless in the watch glass recess while connecting the first glass to the second glass. Due the fixed position of the setting during the connecting process, a desired positioning of the setting and thus also of the decorative element in the finished watch glass can be precisely achieved. In addition, a particularly strong connection of the setting o the watch glass is ensured.

A material, in particular an adhesive material, which remains stable between 110 degrees Celsius and 150 degrees Celsius, in particular between 130 degrees Celsius and 145 degrees Celsius, is insensitive to water and does not react with the material of the starting intermediate layer, is advantageously used as the material for the above described material connection.

According to an alternative embodiment of the invention, a sealing element can preferably be provided at the contact point between the first glass and the setting, in particular between the first glass or rather the first recess region of the first recess and the first setting region instead of a bonded joint.

Correspondingly, according to an alternative embodiment of the invention, a sealing element can preferably be provided at the contact point between the second glass and the setting, in particular between the second glass or rather the first recess region of the first recess and the second setting region instead of a bonded joint.

For example, a two-component epoxy resin or a water-resistant UV adhesive can be used.

For providing the finished watch glass, material of the starting intermediate layer, which has potentially flowed out of the space between the glasses, is removed.

The finished watch glass can then be introduced into the housing of the watch, in particular circumferentially glued thereto.

Further details, advantages and features of the present invention result from the following description of exemplary embodiments with reference to the drawing, wherein identical, or functionally identical, elements are each provided with the same reference sign.

Figure 2:
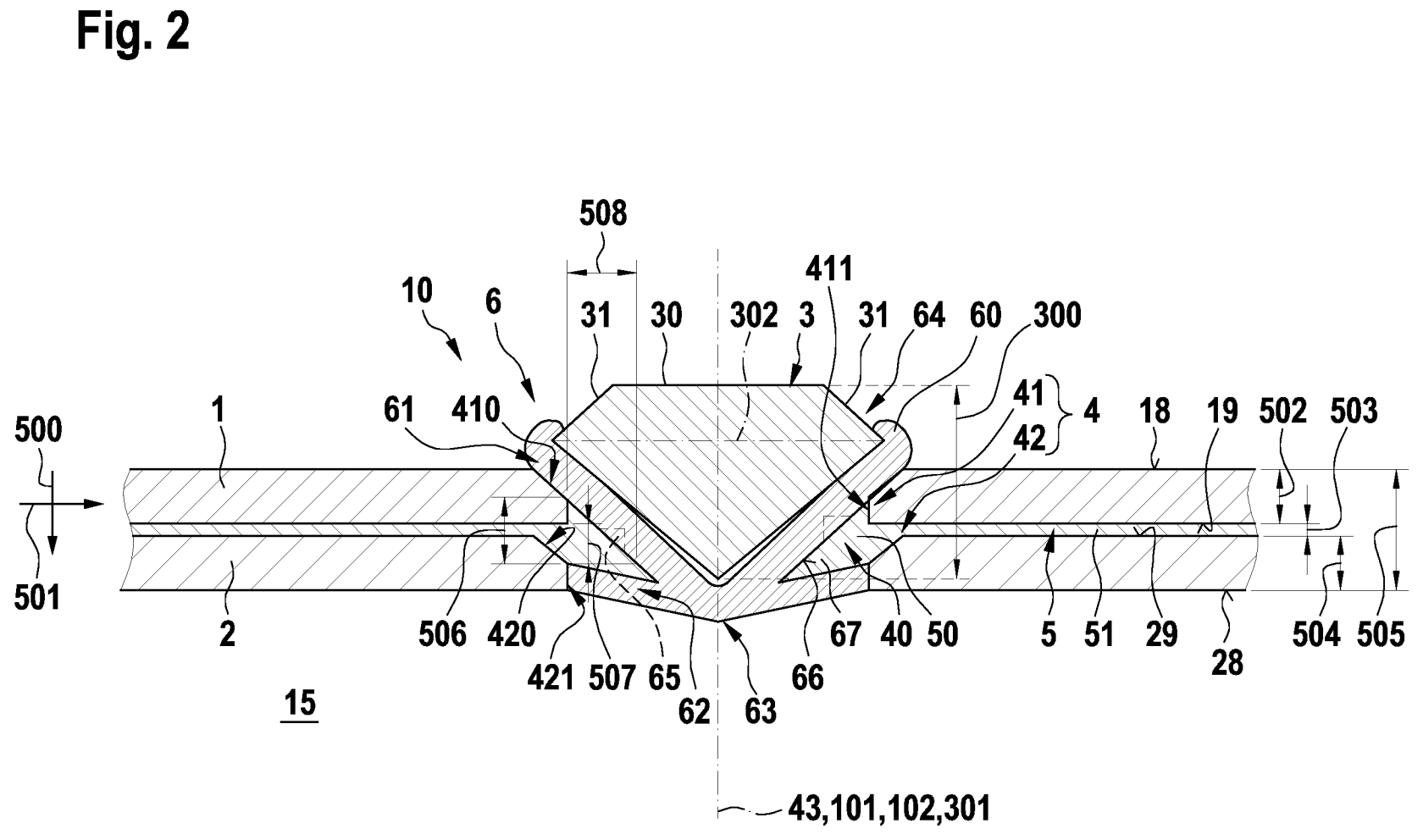
Figure 3:
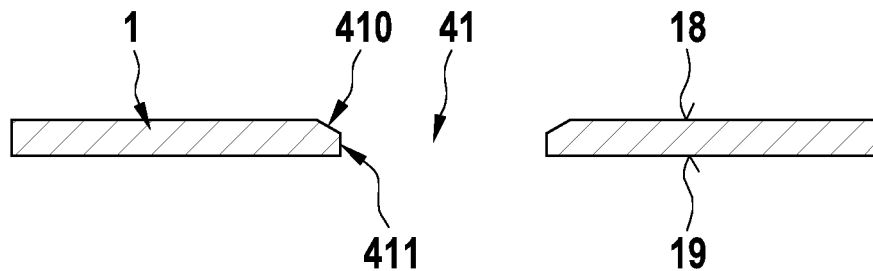
Figure 4:
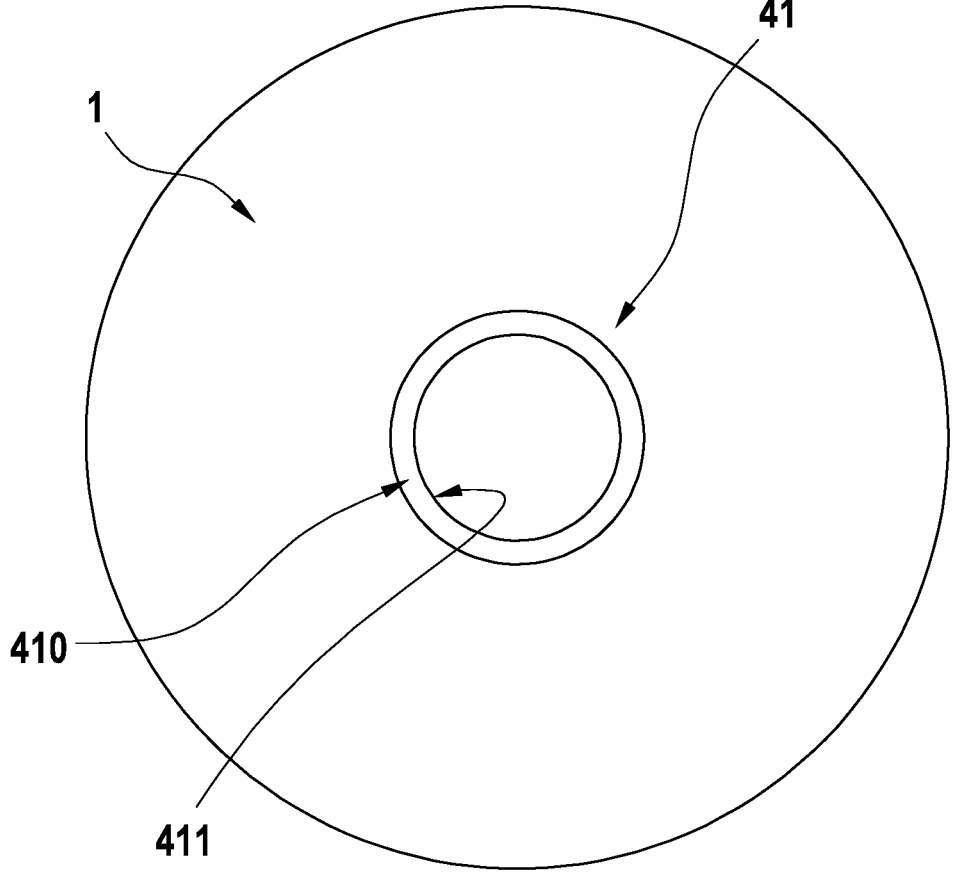
Figure 5:
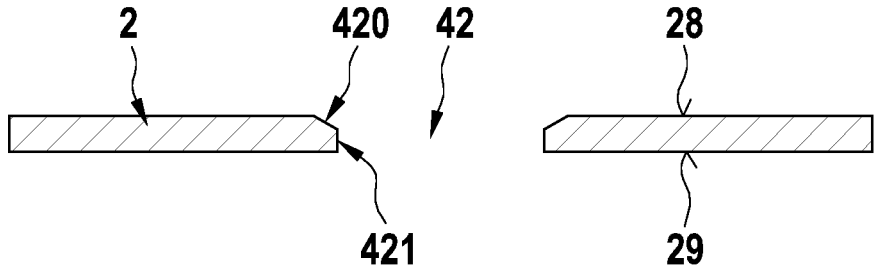
Figure 6:
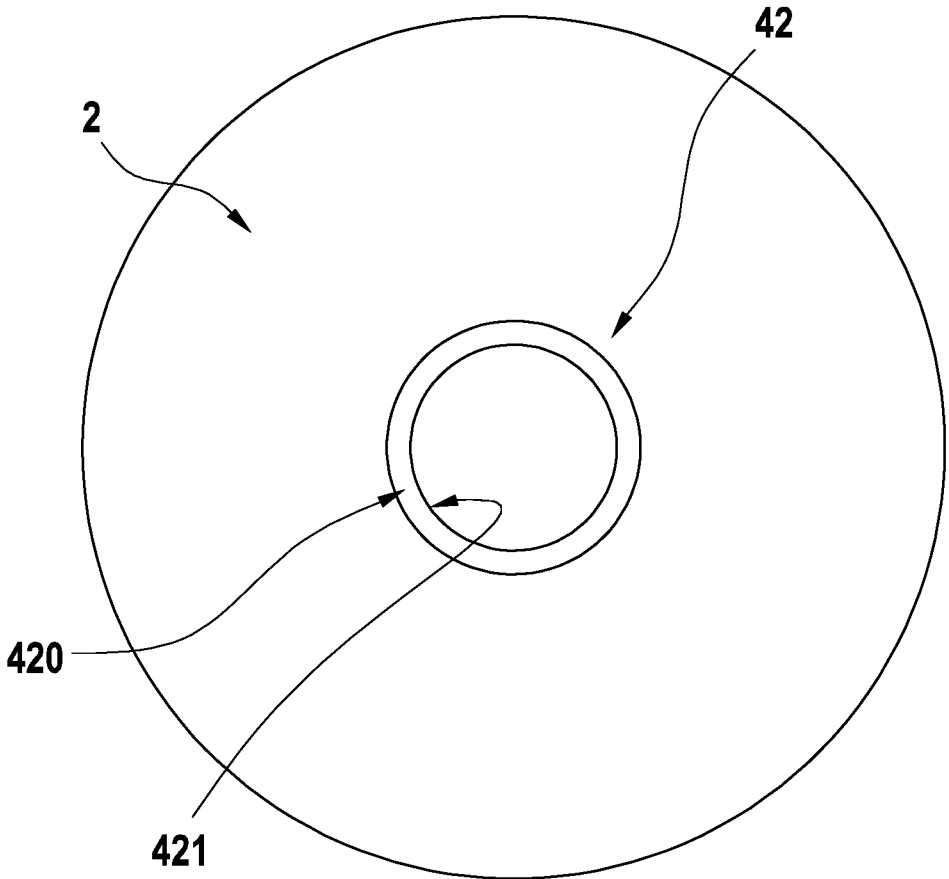
Figure 7:
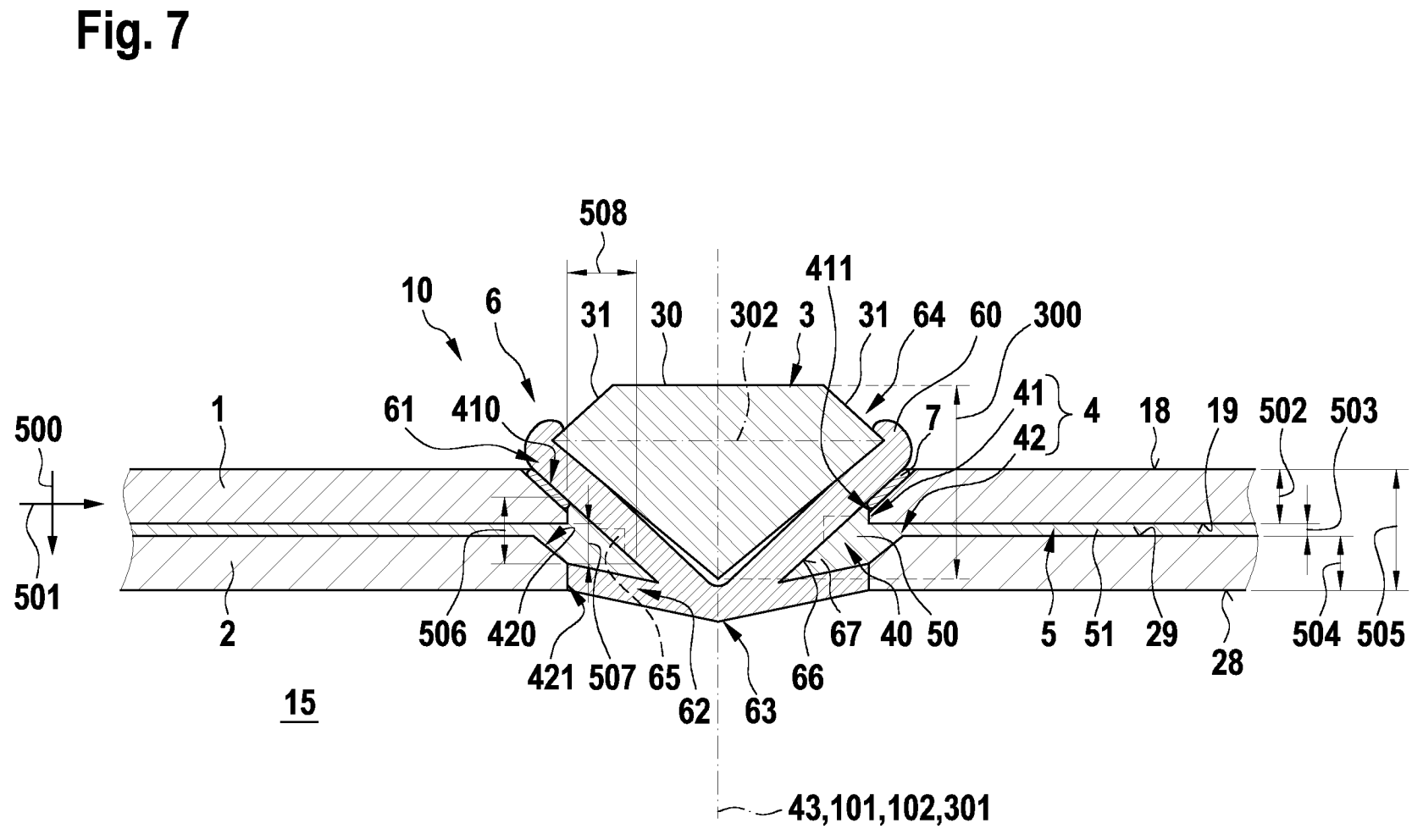

FIG. 1 shows a schematic top view of a watch according to the invention, which has a watch glass according to a first exemplary embodiment of the present invention, FIG. 2 shows a schematic sectional view of the watch glass according to the section A-A indicated in FIG. 1, FIG. 3 shows a schematic sectional view of a first glass of the watch glass of FIG. 2, FIG. 4 shows a top view of the first glass of FIG. 3, FIG. 5 shows a schematic sectional view of a second glass of the watch glass of FIG. 2, FIG. 6 shows a top view of the second glass of FIG. 5, and FIG. 7 shows a schematic sectional view of a watch glass according to a second exemplary embodiment of the present invention.

In the following, a watch 100 with a watch glass 10 according to a first exemplary embodiment of the present invention as well as a manufacturing method of the watch glass 10 and respectively of the watch 100 is described in detail with reference to FIGS. 1 to 6.

As can be seen from FIG. 1, the watch 100 has a housing 11, in which the watch glass 10 is arranged. In particular, the watch glass 10 is adhered over its circumference to the housing 11. The housing 11 as well as the watch glass 10 are formed circularly, but can have any other shape such as of a rectangle, a polygon, etc.

The watch 100, which is in particular a wristwatch, furthermore has a dial 12, which is formed, for example, as a gold-leaf, three hands 13 for displaying the hours, minutes and seconds, and two attachments 14 for attaching the housing 11 to a wristband 16. The dial 12 and the hands 13 are arranged in an interior space 15 of the housing.

It also results from FIGS. 1 and 2 that a decorative element 3 is provided in the watch glass 10. In particular, the decorative element 3 is a diamond, which is arranged in the center of the watch glass 10. This means that the center axis 301 of the decorative element 3 coincides with the center axis 101 of the watch glass 10. Another arrangement of the decorative element 3, in particular a non-centered arrangement of the decorative element 3 with respect to the watch glass 10, is, however, also possible.

Preferably, the decorative element 3 has a weight of at least 2 carat, preferably of at least 3 carat, preferably of at least 4 carat, particularly preferably at least 5 carat. Due to its size, the decorative element 3 gives distinction to the appearance of the watch glass 10 and thus also the watch 100. For arranging the decorative element 3 at the watch glass 10, a setting 6 is provided, in which the decorative element 3 is received. The setting 6 is in particular a metal setting, such as, for example, a gold setting, platinum setting, silver setting or stainless steel setting.

It can be seen from FIG. 2 that the watch glass 10 comprises a first glass 1 and a second glass 2, which are formed in particular as flat glass plates. However, it is also possible to form the glasses 1, 2 curved with the same curvature on their contact surfaces.

The first glass 1 and the second glass 2 lie on top of one another and are connected to one another in a planar manner via a connecting intermediate layer 5. Owing to the material connection by means of the intermediate layer 5, an air-tight and water-tight junction between the glasses 1, 2 is formed.

In particular, the connecting intermediate layer 5 is formed from a transparent laminating film. For example, the connecting intermediate layer 5 can be formed from an EVA laminating film or a PVB laminating film.

The first glass 1 faces away from an interior space 15 of the housing 11 and respectively the second glass 2 faces towards the interior space 15 of the housing 12. Thus, the first glass 1 is the glass which the light encounters first. Within the scope of the invention, the first glass 1 can also be referred to as upper glass or outer glass and the second glass as lower glass or inner glass.

In an advantageous manner, the first glass 1 is formed from sapphire glass, which has a high scratch resistance. The second glass 2 is made of mineral glass. Other materials, such as other types of glass or plastic, are, however, also possible for both the first glass 1 and the second glass 2.

A first recess 41 is formed in the first glass 1 and a second recess 42 in the second glass 2. The first recess 41 and the second recess 42, both of which are continuously formed, define a watch glass recess 4 in the watch glass 10. A center axis 43 of the watch glass recess 4 lies on the center axis 101 of the watch glass 10.

The setting 6 is inserted in the watch glass recess 4 or rather in the first recess 41 and the second recess 42.

A space 40 of the watch glass recess 4 is bounded by the first glass 1, the second glass 2 and the setting 6. The space 40 is completely filled with connecting material 50 of the connecting intermediate layer 5, so that the setting 6 is connected via the connecting material 50 to the first glass 1 and the second glass 2.

Here, the connecting intermediate layer 5 comprises both connecting material 51, which is located between the opposite surfaces 19, 29 of the glasses 1, 2, and the connecting material 50, which is located in the space 40 of the watch glass recess 4. In other words, the connecting material 50 in the space 40 forms together with the connecting material 51 between the opposite surfaces 19, 29 of the glasses 1, 2 the connecting intermediate layer 5, which is formed continuously.

Thus, the connecting intermediate layer 5 serves to connect the first glass 1 to the second glass 2 as well as the setting 6 to both glasses 1, 2.

The setting 6, which is rotation-symmetrically formed, partially surrounds the decorative element 3, so that an upper part of the decorative element 3 is covered by no further component and accordingly is in direct contact with air. Here, a table 30 and partially the upper part facets 31 of the decorative element 3 formed as a diamond are in direct contact with air. Thus, light can directly encounter the decorative element 3.

For fixing the decorative element 3 in the setting 6, the setting 6 has a crimp 60. It is, however, also possible that the decorative element 3 is glued in the setting 6 or connected thereto in another way.

Preferably, the setting 6 has a first setting region 61 and a second setting region 62. Here, the space 40 of the watch glass recess 4 is defined by the first glass 1, the second glass 2, the first setting region 61 and the second setting region 62.

In particular, the first setting region 61 faces away from the interior space 15 of the housing 11 and the dial 12 of the watch 100 in comparison to the second setting region 62. Correspondingly, the second setting region 62 faces towards the interior space 15 and the dial 12 in comparison to the first setting region 61.

The first setting region 61 and the second setting region 62 are each inclined relative to an axis 102 perpendicular to the glasses 1, 2. The axis 102 perpendicular to the glasses 1, 2 coincides in this exemplary embodiment with the center axis 101 of the watch glass 10 and is parallel to the thickness direction 500 of the glasses 1, 2.

The second setting region 62 has a greater inclination than the first setting region 61. In other words, the second setting region 62 is more inclined relative to the axis 102 perpendicular to the glasses 1, 2 than the first setting region 61.

In particular, the first setting region 61 and the second setting region 62 are conically formed, wherein the setting regions 61, 62 have a common end region 63. Other shapes for the first setting region 61 and/or the second setting region 62 are, however, also possible.

The setting 6 or rather the first setting region 61 also has an opening 64, through which the decorative element 3 is inserted into the setting 6.

The first setting region 61 and the second setting region 62 define an intermediate space 67 which is filled in the mounted state of the setting 6 with the connecting material 50 of the connecting intermediate layer 5.

It can be seen from FIG. 2 that a maximum thickness 507 of the connecting intermediate layer 5 between the first glass 1 and the second glass 2 in the thickness direction 500 of the glasses 1, 2 is smaller than a maximum thickness 506 of the connecting material 50 of the connecting intermediate layer 5 in the space 40 between the first glass 1, the second glass 2 and the setting 6 in the thickness direction of the glasses 1, 2.

Furthermore, a maximum thickness 507 of the connecting intermediate layer 5 between the first glass 1 and the second glass 2 in the thickness direction 500 of the glasses 1, 2 is smaller than a maximum thickness 508 of the connecting material 50 of the connecting intermediate layer 5 in the space 40 between the first glass 1, the second glass 2 and the setting 6 in a direction 501 perpendicular to the thickness direction 500 of the glasses 1, 2.

For example, the maximum thickness 507 can be up to 0.4 mm, preferably up to 0.5 mm. The maximum thickness 508 can be for example 2 mm.

Furthermore, the connecting material 50 of the connecting intermediate layer 5 in the space 40 has a triangle-shaped cross-section on a sectional plane perpendicular to the upper surface 18 of the watch glass 10. Here, the sectional plane is defined by the thickness direction 500 of the glasses 1, 2 and a direction 501 perpendicular to the thickness direction 500.

In this exemplary embodiment, the second setting region 62 projects beyond the lower surface 28 of the second glass 2, in particular at most by 20%, preferably at most by 10%, particularly preferably at most by 5%, of a thickness 505 of the watch glass 10.

The thickness 505 of the watch glass 10 corresponds to the sum of the thickness 502 of the first glass 1, the thickness 503 of the second glass 2 and the thickness 504 of the connecting intermediate layer 5 in the region between the first glass 1 and the second glass 2 (measured at the same point).

However, it is also possible that the second setting region 62 ends in the watch glass recess 4. In particular, the second setting region 62 can here be flush with the lower surface 28 of the second glass 2.

As can be inferred from FIGS. 2, 3 and 4, the first recess 41 has a conical recess region 410 (first recess region of the first recess 41) and a cylinder-shaped recess region 411 (second recess region of the first recess 41). Correspondingly, the second recess 42 has according to FIGS. 2, 5 and 6 a conical recess region 420 (first recess region of the second recess 42) and a cylinder-shaped recess region 421 (second recess region of the second recess 42). Other shapes for the first recess 41 and/or the second recess 42, in particular for the recess regions 410, 411, 420, 422 are, however, also possible.

The conical recess region 410 of the first recess 41 is arranged at the upper surface 18 of the first glass 1, wherein the conical recess region 420 of the second recess 42 is arranged at the upper surface 29 of the second glass 2. Correspondingly, the cylinder-shaped recess region 411 is arranged at the lower surface 19 of the first glass 1, wherein the cylinder-shaped recess region 421 is arranged at the lower surface 29 of the second glass 2.

In particular, the conical recess region 410 of the first recess 41 extends over the upper half of the depth of the first recess 1, wherein the cylinder-shaped recess region 411 of the first recess 41 extends over the lower half of the depth of the first recess 41. The same also applies with respect to the conical recess region 420 and the cylinder-shaped recess region 421 of the second recess 42.

For forming the conical recess regions 410, 420, the first recess 41 and the second recess 42 are chamfered at the upper surfaces 18, 28 of the glasses 1, 2 completely in the circumferential direction, i.e. over 360 degrees.

As can be seen from FIG. 2, the first setting region 61 abuts on the conical recess region 410 of the first recess 41 and has at their contact point a same shape as the conical recess region 410. In particular, the first setting region 61 is glued to the conical recess region 410 of the first recess 41.

In a corresponding manner, the second setting region 62 contacts the cylinder-shaped recess region 421 of the second recess 42 and has at their contact point the same shape as the cylinder-shaped recess region 421. In particular, the second setting region 62 is glued to the cylinder-shaped recess region 421 of the second recess 42.

Thus, the space 40 of the watch glass recess 4 is defined in particular by the cylinder-shaped recess region 411 of the first recess 41, the first setting region 61, the second setting region 62 and the cylinder-shaped recess region 421 of the second recess 42.

The decorative element 3 projects beyond an upper surface 18 of the watch glass 10 and is arranged partially in the watch glass recess 4. In particular, the decorative element 3 has a dimension 300 parallel to the thickness direction 500 of the glasses 1, 2 that is greater than 100% of the thickness 505 of the watch glass 10. The decorative element 3 can, however, have a dimension 300 parallel to the thickness direction 500 of the glasses 1, 2 that is smaller than the thickness 505 of the watch glass 10. Here, the decorative element 3 can be arranged in such a way that it still projects beyond the upper surface 18 of the watch glass 10.

As can be seen from FIGS. 1 and 2, the decorative element 3 also has a maximum cross-sectional area 302 in the direction 501 perpendicular to the thickness direction 500. The maximum cross-sectional area 302 can be at least $\frac{1}{20}$, preferably at least $\frac{1}{16}$, particularly preferably at least $\frac{1}{10}$, of the area of the upper surface 18 of the first glass 1.

Correspondingly, the watch glass recess 4, in particular the first recess 41, has a cross-sectional area 400, in particular on the upper surface 18 of the first glass 1 in a direction 501 perpendicular to the thickness direction 500, which is at least $\frac{1}{20}$, preferably at least $\frac{1}{16}$, particularly preferably at least $\frac{1}{10}$, of the surface of the upper surface 18 of the first glass 1.

According to FIG. 2, a recess 65 (drawn as dashed line) can optionally be formed in a jacket surface 66 of the setting 6. In particular, the recess 65 can be a completely circumferential groove. In this design of the setting 6, the groove is advantageously filled with connecting material of the connecting intermediate layer 5 and is connected to the connecting material 50 in the space 40 between the first glass 1, the second glass 2 and the setting 6. Owing to the recess 65, an additional contact surface between the setting 6 and the connecting intermediate layer 5 is available, so that an even more secure connection of the setting 6 to the watch glass 10 can be achieved.

For manufacturing the previously described watch glass 1, the first glass 1 and the second glass 2, the decorative element 3 and the setting 6 are first provided.

The first recess 41 and the second recess 42 can preferably be formed by means of laser drilling or mechanical drilling or water jet cutting or ultrasonic drilling or pressing into the respective glass 1, 2.

After the forming of the recesses 41, 42, the upper surfaces 18, 29 and the lower surfaces 19, 28 of the glasses 1, 2 are ground. Thus, potentially emerging breakouts at the recesses 41, 42 can be removed.

For providing the decorative element 3 formed as a diamond, a raw diamond is cut so that the diamond has the desired cut shape.

The decorative element 3 is then cased in the setting.

A starting intermediate layer that is formed as a laminating film is placed on the second glass 2. The laminating film is provided with an opening, which is formed in the laminating film in such a way that, in the arranged state of the laminating film on the second glass 2, it is positioned at the location of the second recess 42.

Then, the first glass 1 is placed on the second glass 2 or rather the laminating film and the setting 6 with the decorative element 3 is inserted into the recess formed by the first recess 41, the opening of the laminating film and the second recess 42.

At first, the first setting region 61 is glued to the conical recess region 410 of the first recess 41.

Finally, the first glass 1 and the second glass 2 are connected to one another.

It is, however, possible that connecting the first glass 1 to the second glass 2 can take place before gluing the first setting region 61 to the conical recess region 410 of the first recess 41.

For connecting the first glass 1 to the second glass 2, air is first removed from the intermediate space between the glasses 1, 2, so that a vacuum prevails in the intermediate space between the glasses 1, 2.

The arrangement of the first glass 1, the second glass 2 and the laminating film arranged therebetween is heated at a temperature between 110 degrees Celsius and 150 degrees Celsius, in particular between 130 degrees Celsius to 145 degrees Celsius. Furthermore, pressure is exerted on the arrangement of the glasses 1, 2.

Through the heating, the laminating film becomes pasty or liquid. Consequently, and due to the pressure exerted on the arrangement of the first glass 1 and the second glass 2, the material of the laminating film flows into the space 40, which is defined by the first glass 1, the second glass 2, the first setting region 61 and the second setting region 62, and completely fills it.

If the setting 6 has the previously described groove 65, the material of the laminating film also flows into the groove 65.

After the material of the laminating film has been cooled, a fixed connection of the first glass 1 to the second glass 2 as well as of the setting 6 to the glasses 1, 2 is achieved. Here, the starting intermediate layer formed as a laminating film has become the connecting intermediate layer 5 in the finished watch glass 10.

If due to the connecting process material of the laminating film has flowed out of the intermediate space between the first glass 1 and the second glass 2, this material is removed for manufacturing the finished watch glass 10.

The finished watch glass 10 is then introduced into the housing 11 of the watch 100 and glued to it over its circumference.

By means of the described method, the setting 6 is surrounded by connecting material of the connecting intermediate layer 5, so that an "anchor" is provided that holds the setting 6 stably on the first glass 1 and on the second glass 2 and passes an impact energy on both glasses 1, 2 in the event of a potential impact of the setting 6. Thus, it can be avoided that the setting 6 is detached from the watch glass 10 and consequently falls out of the watch glass recess 4. This "anchor", which is formed by the connecting material 50 in the space 40 between the first glass 1, the second glass 2 and the setting 6, can hold the setting 6 in the watch glass recess 6 even if the latter were supposed to tear off from the connecting material 51 of the connecting intermediate layer 5 between the first glass 1 and the second glass 2.

In FIG. 7, a watch glass 10 according to a second exemplary embodiment of the present invention is illustrated.

The design of the watch glass 10 according to the second exemplary embodiment generally corresponds to that of the watch glass 10 according to the first exemplary embodiment.

However, the watch glass 10 according to the second exemplary embodiment has in contrast to the watch glass 10 according to the first exemplary embodiment an annular sealing element 7 instead of a bonded joint between the first setting region 61 and the conical recess region 410 of the first recess 41.

In this case, the step of attaching the sealing element 7 to the first glass 1 preferably takes place before connecting the first glass 1 to the second glass 2. Due to the connecting process between the glasses 1, 2, the sealing element 7 is advantageously pressed by the setting 6.

A water- and air-tight arrangement of the setting 6 on the first glass 1 is thus achieved. It can thereby be avoided that the connecting intermediate layer 5 comes in contact with water or the air humidity.

In addition to the above written description of the invention, reference is hereby made explicitly, for the complementary disclosure thereof, to the graphic representation of the invention in FIGS. 1 to 7.

LIST OF REFERENCE SIGNS

1 first glass
2 second glass
3 decorative element
4 watch glass recess
5 connecting intermediate layer
6 setting
7 sealing element
10 watch glass
11 housing
12 dial
13 hand
14 attachment for a wristband
15 interior space
16 wristband
18 upper surface
19 surface
28 lower surface
29 surface
30 table
31 upper part facet
40 space
41 first recess
42 second recess
43 center axis
50 intermediate space 60 crimp
61 first setting region
62 second setting region
63 end region
64 opening
65 recess
66 jacket surface
67 intermediate space
100 watch
101 center axis
102 axis
300 dimension
301 center axis
302 cross-sectional area
400 cross-sectional area
410 conical recess region
411 cylinder-shaped recess region
420 conical recess region
421 cylinder-shaped recess region
500 thickness direction
501 perpendicular direction to the thickness direction
502 thickness
503 thickness
504 thickness
505 thickness
506 thickness
507 thickness
508 thickness

The invention claimed is:

1. A watch glass, comprising:
a first glass,
a second glass, which is connected to the first glass via a connecting intermediate layer,
a decorative element, which is inserted in a setting, and
a watch glass recess, which is formed by a first recess in the first glass and a second recess in the second glass,
wherein the setting is arranged in the watch glass recess,
wherein the setting has a first setting region and a second setting region, and at least one of the first setting region or the second setting region are inclined relative to an axis being perpendicular to the glasses, and wherein the second setting region has a larger inclination than the first setting region,
wherein a space of the watch glass recess, which is defined by the first glass, the second glass and the setting, is filled with connecting material of the connecting intermediate layer, so that the setting is connected via the connecting material to the first class and the second glass.

2. The watch glass according to claim 1, wherein the setting has at least a recess that is formed in a jacket surface of the setting.

3. The watch glass according to claim 1, wherein the second setting region projects beyond a lower surface of the second glass.

4. The watch glass according to claim 3, wherein the second setting region projects beyond the lower surface of the second glass at most by 20% of a thickness of the watch glass.

5. The watch glass according to claim 1, wherein the first recess is continuously formed.

6. The watch glass according to claim 1, wherein the decorative element has a dimension, which is at least 50% of a thickness of the watch glass, parallel to an axis being perpendicular to one of the glasses.

7. The watch glass according to claim 1, wherein the decorative element projects beyond an upper surface of the watch glass.

8. The watch glass according to claim 1, wherein the first recess and/or the second recess has/each have a conical recess region and a cylinder-shaped recess region.

9. The watch glass according to claim 8, wherein the first setting region abuts on the conical recess region of the first recess and/or wherein the second setting region abuts on the cylinder-shaped recess region of the second recess.

10. The watch glass according to claim 9, wherein the first setting region abuts on the conical recess region of the first recess and/or the second setting region abuts on the cylinder-shaped recess region of the second recess with an intermediate bonded joint or an intermediate sealing element.

11. The watch glass according to claim 9, wherein the first setting region has at the contact point with the conical recess region a complementary shape to it and/or wherein the second setting region has at the contact point with the cylinder-shaped recess region a complementary form to it.

12. The watch glass according to claim 11, wherein the first setting region abuts on the conical recess region of the first recess and/or the second setting region abuts on the cylinder-shaped recess region of the second recess with an intermediate bonded joint or an intermediate sealing element.

13. A watch, comprising a watch glass according to claim 1.

14. The watch glass according to claim 1, wherein the decorative element has a dimension, which is at least 80% of a thickness of the watch glass, parallel to an axis being perpendicular to one of the glasses.

15. The watch glass according to claim 1, wherein the decorative element has a dimension, which is over 100% of a thickness of the watch glass, parallel to an axis being perpendicular to one of the glasses.

* * * * *